US012322907B2

(12) United States Patent
Wang et al.

(10) Patent No.: US 12,322,907 B2
(45) Date of Patent: Jun. 3, 2025

(54) ELECTRICAL RECEPTACLE CONNECTOR WITH METALLIC PLATE

(71) Applicant: ADVANCED-CONNECTEK INC., New Taipei (TW)

(72) Inventors: Shu-Fen Wang, New Taipei (TW); Yu-Chai Yeh, New Taipei (TW); Guan-Lin Chen, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 381 days.

(21) Appl. No.: 17/889,444

(22) Filed: Aug. 17, 2022

(65) Prior Publication Data

US 2023/0058301 A1 Feb. 23, 2023

(30) Foreign Application Priority Data

Aug. 18, 2021 (TW) ................................ 110209786

(51) Int. Cl.

| | |
|---|---|
| ***H01R 13/6585*** | (2011.01) |
| ***H01R 13/504*** | (2006.01) |
| *H01R 24/60* | (2011.01) |
| *H01R 107/00* | (2006.01) |

(52) U.S. Cl.

CPC ....... *H01R 13/6585* (2013.01); *H01R 13/504* (2013.01); *H01R 24/60* (2013.01); *H01R 2107/00* (2013.01)

(58) Field of Classification Search

CPC .................. H01R 24/64; H01R 13/504; H01R 13/6581-6597; H01R 24/60; H01R 2107/00

See application file for complete search history.

(56) References Cited

U.S. PATENT DOCUMENTS

| | | | | |
|---|---|---|---|---|
| 2015/0207280 A1* | 7/2015 | Little | H01R 13/6591 | 439/607.34 |
| 2015/0340821 A1* | 11/2015 | Yen | H01R 13/46 | 439/607.01 |
| 2016/0064866 A1* | 3/2016 | Kao | H01R 24/60 | 439/676 |
| 2018/0109042 A1* | 4/2018 | Little | H01R 24/60 | |
| 2019/0288465 A1* | 9/2019 | Little | H01R 24/60 | |
| 2020/0235517 A1* | 7/2020 | Tsai | H01R 13/52 | |

* cited by examiner

*Primary Examiner* — Tulsidas C Patel
*Assistant Examiner* — Carlos E Lopez-Pagan
(74) *Attorney, Agent, or Firm* — Muncy, Geissler, Olds & Lowe, P.C.

(57) ABSTRACT

An electrical receptacle connector includes a metallic shell, an insulated housing in the metallic shell, a plurality of terminals at the insulated housing, and a metallic plate. The terminals are arranged in two rows, and the metallic plate is at the insulated housing and between the terminals in the two rows. The metallic plate includes a first through hole portion, several second through hole portions, and several communication hole portions. By allowing that the communication hole portions communication hole portions to be in communication with the first through hole portion and the second through hole portions in the metallic plate, the molding efficiency for forming the tongue portion with the filling of the plastic materials can be increased.

20 Claims, 7 Drawing Sheets

ELECTRICAL RECEPTACLE CONNECTOR WITH METALLIC PLATE

CROSS-REFERENCE TO RELATED APPLICATION

This non-provisional application claims priority under 35 U.S.C. § 119(a) to Patent Application No. 110209786 in Taiwan, R.O.C. filed on Aug. 18, 2021, the entire contents of which are hereby incorporated by reference.

FIELD OF THE INVENTION

The instant disclosure relates to an electrical connector, and more particular to an electrical receptacle connector.

BACKGROUND

Generally, Universal Serial Bus (USB) is a serial bus standard to the PC architecture with a focus on computer interface, consumer and productivity applications. The existing Universal Serial Bus (USB) interconnects have the attributes of plug-and-play and ease of use by end users. Now, as technology innovation marches forward, new kinds of devices, media formats and large inexpensive storage are converging. They require significantly more bus bandwidth to maintain the interactive experience that users have come to expect. In addition, the demand of a higher performance between the PC and the sophisticated peripheral is increasing. The transmission rate of USB 2.0 is insufficient. As a consequence, faster serial bus interfaces such as USB 3.0, are developed, which may provide a higher transmission rate so as to satisfy the need of a variety devices.

SUMMARY OF THE INVENTION

The appearance, the structure, the contact ways of terminals, the number of terminals, the pitches between terminals (the distances between the terminals), and the pin assignment of terminals of a USB type-C electrical connector known to the inventor(s) are totally different from those of a USB electrical connector known to the inventor(s). When a user slantly inserts an electrical plug connector known to the inventor into an electrical receptacle connector known to the inventor, the tongue portion inside the electrical receptacle connector will be pushed by the components of the electrical plug connector and thus being damaged or broken easily.

In view of this, according to one or some embodiments, an electrical receptacle connector is provided. The electrical receptacle connector comprises a metallic shell, an insulated housing, a plurality of terminals, and a metallic plate. The metallic comprises a receiving cavity. The insulated housing is in the receiving cavity. The insulated housing comprises a base portion and a tongue portion extending outwardly from one side of the base portion. The terminals are arranged in two rows and at the insulated housing. The metallic plate is at the tongue portion and between the terminals in the two rows. The metallic plate has a large cutout at a front edge thereof. Each of two sides of the metallic plate has a protrusion, and a side portion of each of the protrusions is exposed from a corresponding one of two sides of the tongue portion. The metallic plate has a first through hole portion, a plurality of second through hole portions, and a plurality of communication hole portions. The first through hole portion is located at a central portion of the metallic plate. Each of the second through hole portions is between a corresponding one of the protrusions and the large cutout. Each of the communication hole portions is between the first through hole portion and a corresponding one of the second through hole portions and is in communication with the first through hole portion and the corresponding one of the second through hole portions.

In some embodiments, the terminals comprise a plurality of contact portions, and the contact portions are at two faces of the tongue portion. The terminals comprise a plurality of high-speed signal terminals, a plurality of low-speed signal terminals, a plurality of power terminals, and a plurality of ground terminals. The ground terminals are at two outermost sides of the power terminals, and the low-speed signal terminals are between the power terminals. Each of the high-speed signal terminals is between an adjacent one of the power terminals and an adjacent one of the ground terminals.

In some embodiments, the first through hole portion corresponds to the low-speed signal terminals.

In some embodiments, each of the second through hole portions corresponds to a portion between the contact portion of a corresponding one of the power terminals and the contact portion of a corresponding one of the ground terminals.

In some embodiments, each of the communication hole portions is between an adjacent one of the power terminals and an adjacent one of the high-speed signal terminals.

In some embodiments, a portion of the contact portion of each of the high-speed signal terminals adjacent to a corresponding one of the power terminals is exposed from a corresponding one of the communication hole portions.

In some embodiments, the metallic plate has a plurality of recessed portions, each of the recessed portions is at a side portion of a corresponding one of the communication hole portions, and the contact portion of each of the high-speed signal terminals adjacent to a corresponding one of the power terminals is exposed from a corresponding one of the recessed portions.

In some embodiments, a portion of each of the protrusions at an outer side edge of a corresponding one of the second through hole portions is shielded between the contact portion of a corresponding one of the ground terminals at one of the two rows of the terminals and the contact portion of a corresponding one of the ground terminals at the other one of the two rows of the terminals.

In some embodiments, a portion of each of the protrusions at a rear edge of a corresponding one of the second through hole portions is shielded between the contact portion of a corresponding one of the high-speed signal terminals at one of the two rows of the terminals and the contact portion of a corresponding one of the high-speed signal terminals at the other one of the two rows of the terminals.

In some embodiments, each of the protrusions has a turning portion at an inner side edge of a corresponding one of the second through hole portions. An indentation portion is between the protrusions, and front ends of the contact portions of the power terminals are at the indentation portion.

In some embodiments, the tongue portion has a front side surface and two side surfaces. The front side surface is connected to front side portions of the two faces, and the two side surfaces are connected to two sides of the two faces. Outer portions of the protrusions protrude from the two side surfaces, and front ends of the protrusions protrude from the front side surface.

In some embodiments, each of the communication hole portions has a longitudinal section and a transversal section connected to the longitudinal section. Each of the transversal section is connected to the first through hole portion, and each of the longitudinal sections is connected to a corresponding one of the second through hole portions.

In some embodiments, an electrical receptacle connector is provided. The electrical receptacle connector comprises a metallic shell, an insulated housing, a plurality of terminals, and a metallic plate. The metallic shell comprises a receiving cavity. The insulated housing is in the receiving cavity. The insulated housing comprises a base portion and a tongue portion extending outwardly from one side of the base portion. The terminals are arranged in two rows and at the insulated housing. The terminals comprise a plurality of contact portions, and the contact portions are at two faces of the tongue portion. The terminals comprise a plurality of high-speed signal terminals, a plurality of low-speed signal terminals, a plurality of power terminals, and a plurality of ground terminals. The ground terminals are at two outermost sides of the power terminals, and the low-speed signal terminals are between the power terminals. In at least one of the two rows of the terminals, each of the high-speed signal terminals is between an adjacent one of the power terminals and an adjacent one of the ground terminals. The metallic plate is at the tongue portion and between the terminals in the two rows. Each of two sides of the metallic plate has a protrusion, and a side portion of each of the protrusions is exposed from a corresponding one of two sides of the tongue portion. The metallic plate has a first through hole portion, a plurality of second through hole portions, and a plurality of communication hole portions. The first through hole portion corresponds to the low-speed signal terminals. Each of the second through hole portions is at a corresponding one of the protrusions and corresponds to a portion between the contact portion of a corresponding one of the power terminals and the contact portion of a corresponding one of the ground terminals. Each of the communication hole portions is between an adjacent one of the power terminals and an adjacent one of the high-speed signal terminals and is in communication with the first through hole portion and a corresponding one of the second through hole portions.

In some embodiments, a portion of the contact portion of each of the high-speed signal terminals adjacent to a corresponding one of the power terminals is exposed from a corresponding one of the communication hole portions.

In some embodiments, the metallic plate has a plurality of recessed portions. Each of the recessed portions is at a side portion of a corresponding one of the communication hole portions, and the contact portion of each of the high-speed signal terminals adjacent to a corresponding one of the power terminals is exposed from a corresponding one of the recessed portions.

In some embodiments, a portion of each of the protrusions at an outer side edge of a corresponding one of the second through hole portions is shielded between the contact portion of a corresponding one of the ground terminals at one of the two rows of the terminals and the contact portion of a corresponding one of the ground terminals at the other one of the two rows of the terminals.

In some embodiments, a portion of each of the protrusions at a rear edge of a corresponding one of the second through hole portions is shielded between the contact portion of a corresponding one of the high-speed signal terminals at one of the two rows of the terminals and the contact portion of a corresponding one of the high-speed signal terminals at the other one of the two rows of the terminals.

In some embodiments, each of the protrusions has a turning portion at an inner side edge of a corresponding one of the second through hole portions. An indentation portion is between the protrusions, and front ends of the contact portions of the power terminals are at the indentation portion.

In some embodiments, the tongue portion has a front side surface and two side surfaces. The front side surface is connected to front side portions of the two faces, and the two side surfaces are connected to two sides of the two faces. Outer portions of the protrusions protrude from the two side surfaces, and front ends of the protrusions protrude from the front side surface.

In some embodiments, each of the communication hole portions has a longitudinal section and a transversal section connected to the longitudinal section. Each of the transversal sections is connected to the first through hole portion, and each of the longitudinal sections is connected to a corresponding one of the second through hole portions.

Based on the above, according to one or some embodiments of the instant disclosure, in the metallic plate, the communication hole portions are in communication with the first through hole portion and the second through hole portions. Therefore, when the metallic plate and the insulated housing are molded by insert-molding, plastic materials can be conveniently filled through the hollow regions of the communication hole portions to form the entire tongue portion, thereby increasing the molding efficiency as well as reducing the condition that front ends of the contact portions of the terminals are not properly covered by the tongue portion (the short shot condition of the plastic materials).

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
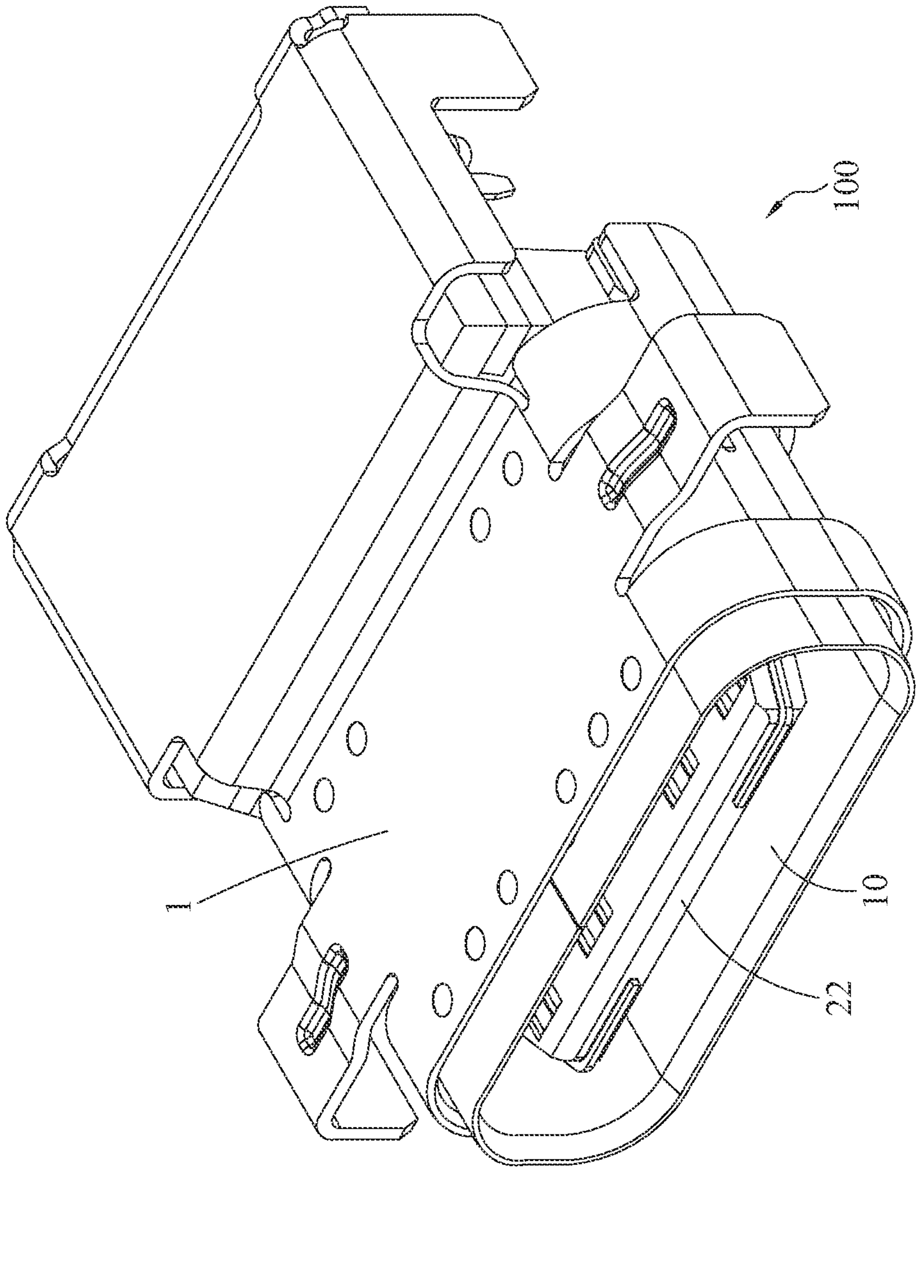
FIG. 1 illustrates a perspective view of an electrical receptacle connector according to some embodiments of the instant disclosure.
Figure 2:
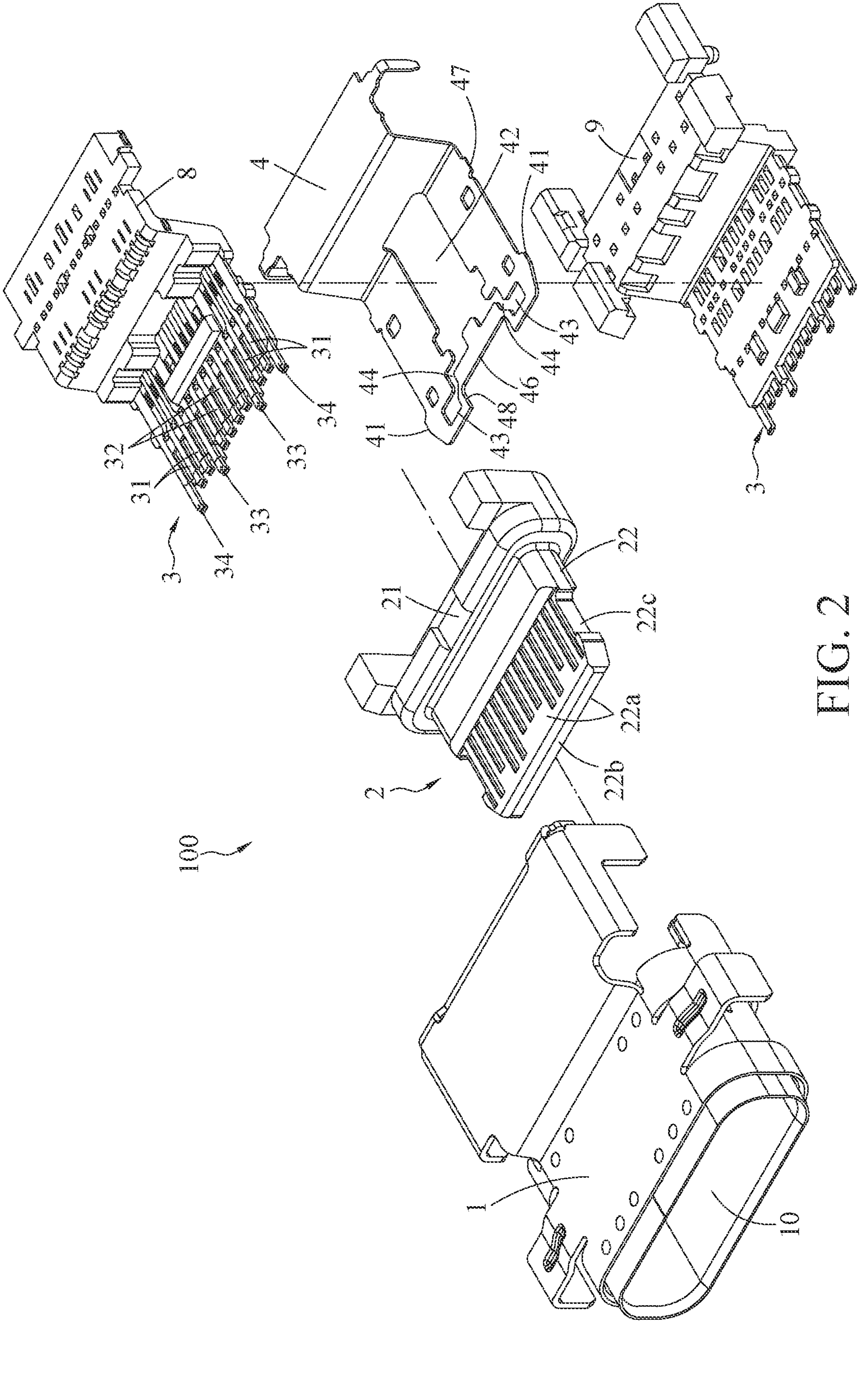
FIG. 2 illustrates an exploded view of the electrical receptacle connector according to some embodiments of the instant disclosure.

Please refer to FIG. 1 and FIG. 2. FIG. 1 illustrates a perspective view of an electrical receptacle connector 100 according to some embodiments of the instant disclosure. FIG. 2 illustrates an exploded view of the electrical receptacle connector 100 according to some embodiments of the instant disclosure. In some embodiments, the electrical receptacle connector 100 is in accordance with the specification of USB type-C connection interfaces. In this embodiment, the electrical receptacle connector 100 comprises a metallic shell 1, an insulated housing 2, a plurality of terminals 3, and a metallic plate 4.

Figure 3:
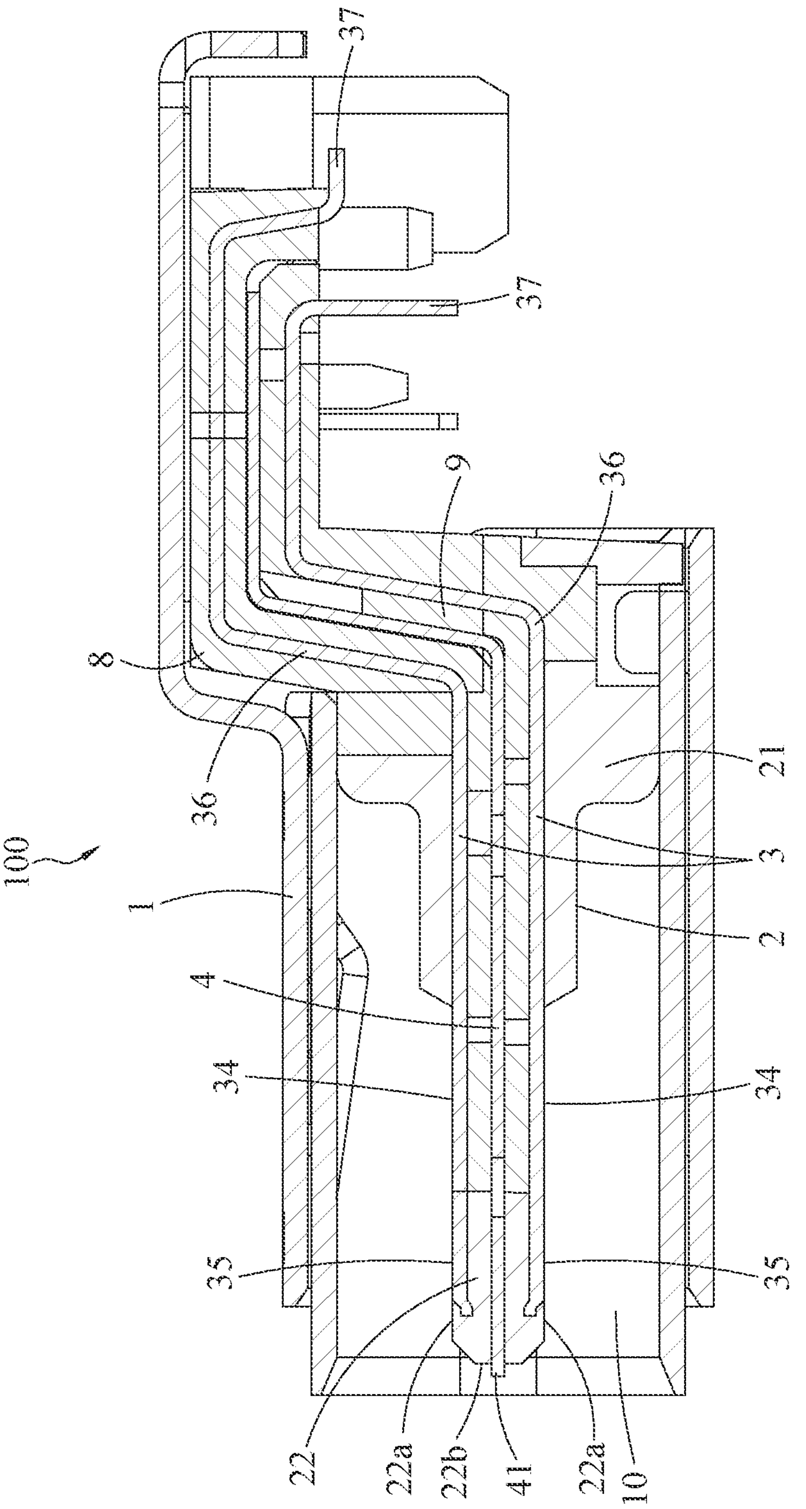
FIG. 3 illustrates a cross-sectional view of the electrical receptacle connector according to some embodiments of the instant disclosure.
Figure 5:
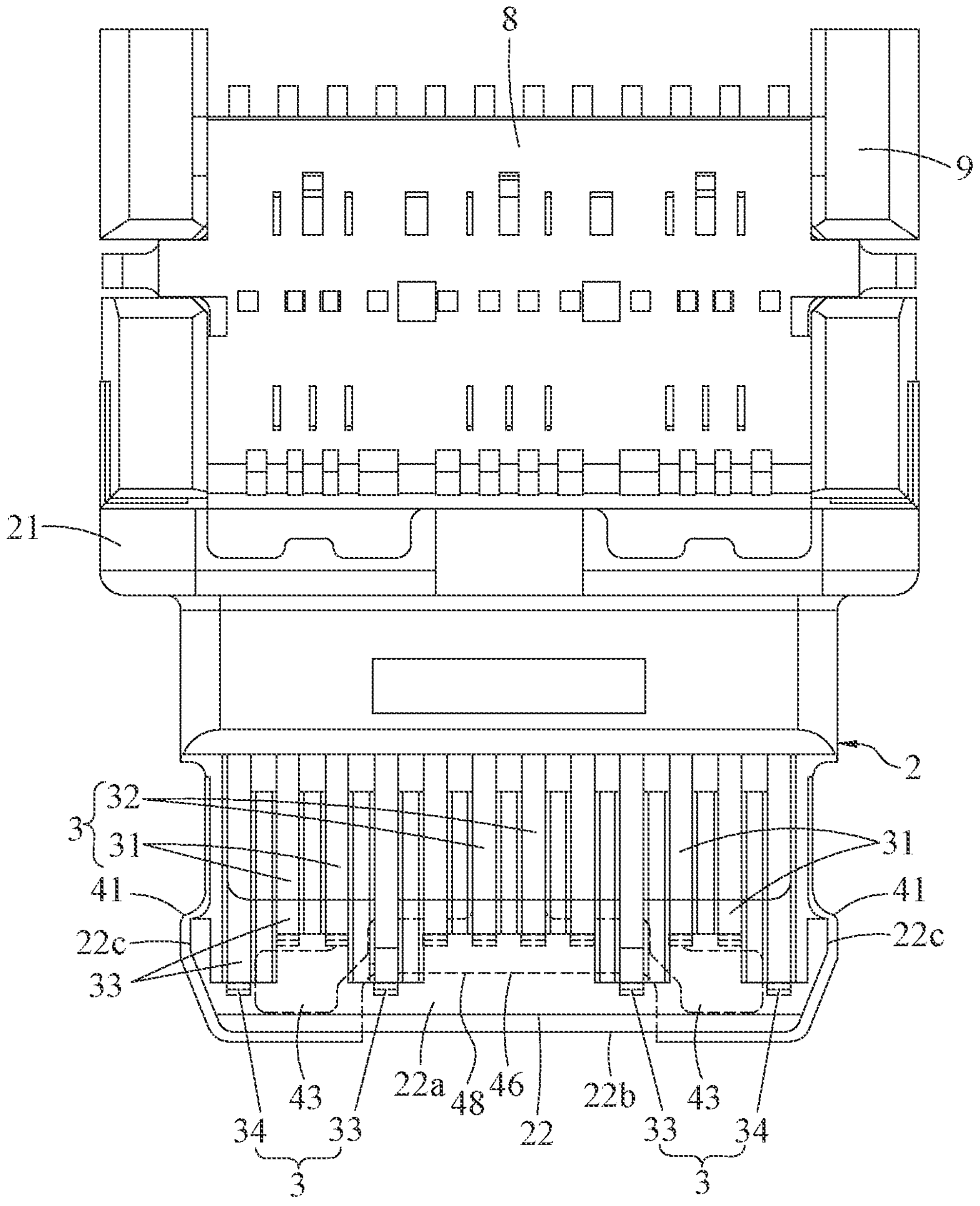
FIG. 5 illustrates a top view of the terminal module of the electrical receptacle connector according to some embodiments of the instant disclosure.

Please refer to FIG. 2 and FIG. 3. FIG. 3 illustrates a cross-sectional view of the electrical receptacle connector 100 according to some embodiments of the instant disclosure. The metallic shell 1 is a hollow shell and has a receiving cavity 10. The insulated housing 2 is in the receiving cavity 10. The insulated housing 2 has a base portion 21 and a tongue portion 22 extending from one side of the base portion 21. The terminals 3 are arranged in two rows, and the two rows are respectively arranged on the insulated housing 2. The terminals 3 comprise a plurality of contact portions 35 at the two faces 22*a* of the tongue portion 22. The terminals 3 comprise a plurality of high-speed signal terminals 31, a plurality of low-speed signal terminals 32, a plurality of power terminals 33, and a plurality of ground terminals 34. The ground terminals 34 are at two outermost sides of the power terminals 33 (as shown in FIG. 5). The low-speed signal terminals 32 are between the power terminals 33. Each of the high-speed signal terminals 31 is between an adjacent one of the power terminals 33 and an adjacent one of the ground terminals 34.

Figure 7:
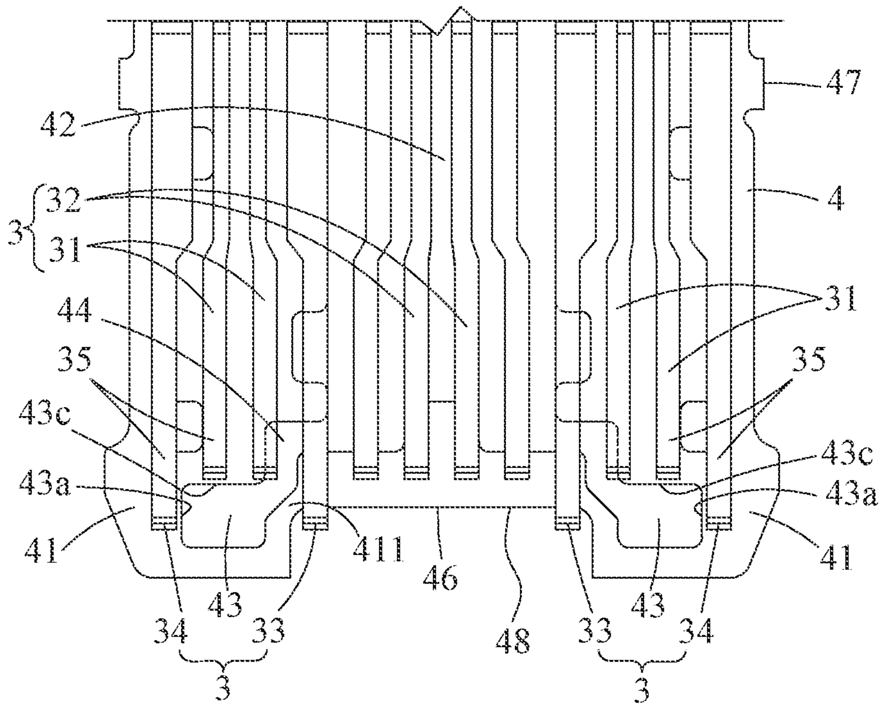
FIG. 7 illustrates a partial top view of the terminals and the metallic plate of the electrical receptacle connector from the viewing angle of FIG. 5.

The metallic plate 4 is at the tongue portion 22 and between the terminals 3 in the two rows. The metallic plate 4 has a large cutout 48 at a front edge thereof. Each of two sides of the metallic plate 4 has a protrusion 41, and a side portion of each of the protrusions 41 is exposed from a corresponding one of two sides of the tongue portion 22. The metallic plate 4 has a first through hole portion 42, a plurality of second through hole portions 42, and a plurality of communication hole portions 44. The first through hole portion is located at a central portion of the metallic plate 4. The first through hole portion 42 corresponds to the low-speed signal terminals 32 (as shown in FIG. 7). Each of the second through hole portions 43 is between a corresponding one of the protrusions 41 and the large cutout 48. Each of the second through hole portions 43 is at a corresponding one of the protrusions 41 and corresponds to a portion between the contact portion 35 of a corresponding one of the power terminals 33 and the contact portion 35 of a corresponding one of the ground terminals 34. Each of the communication hole portions 44 is between the first through hole portion 42 and a corresponding one of the second through hole portions 43. Each of the communication hole portions 44 is between an adjacent one of the power terminals 33 and an adjacent one of the high-speed signal terminals 31 and is in communication with the first through hole portion 42 and a corresponding one of the second through hole portions 43.

Figure 6:
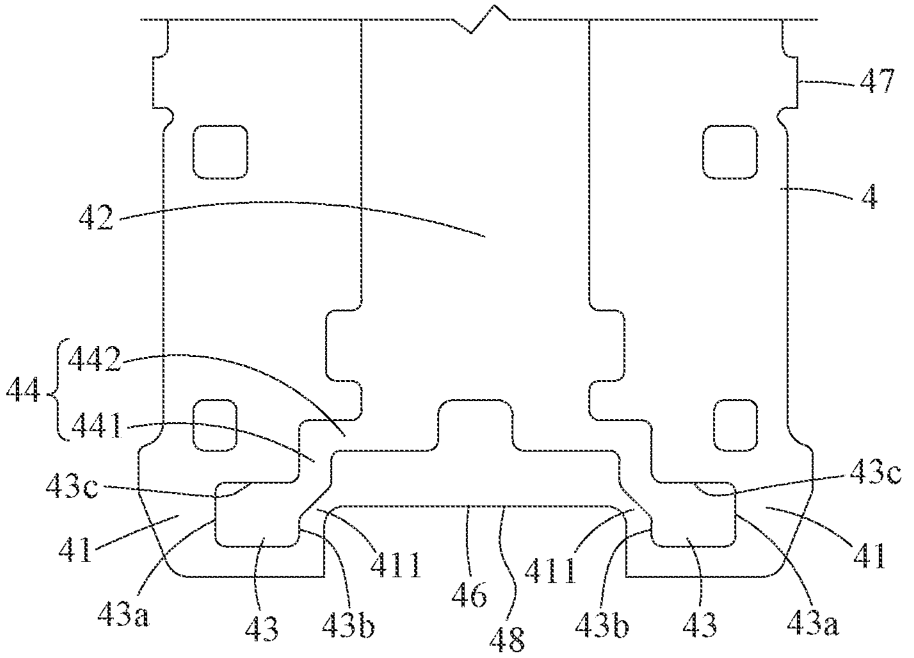
FIG. 6 illustrates a partial top view of the metallic plate of the electrical receptacle connector from the viewing angle of FIG. 5.

The communications 44 are in communication with the first through hole portion 42 and the second through hole portions 43 to form a hole defined through the metallic plate from one of two surfaces of the metallic plate to the other surface of the metallic plate. Therefore, in this embodiment, as shown in FIG. 6, the hole is of an upside down Y shape. When the metallic plate 4 and the insulated housing 2 are molded by insert-molding, plastic materials can be conveniently filled through hollow regions of the first through hole portion 42, the second through hole portions 43, and the communication hole portions 44 to form the entire tongue portion 22, thereby increasing the molding efficiency as well as reducing the condition that front ends of the contact portions 35 of the terminals 3 are not properly covered by the tongue portion 22 (the short shot condition of the plastic materials).

Figure 4:
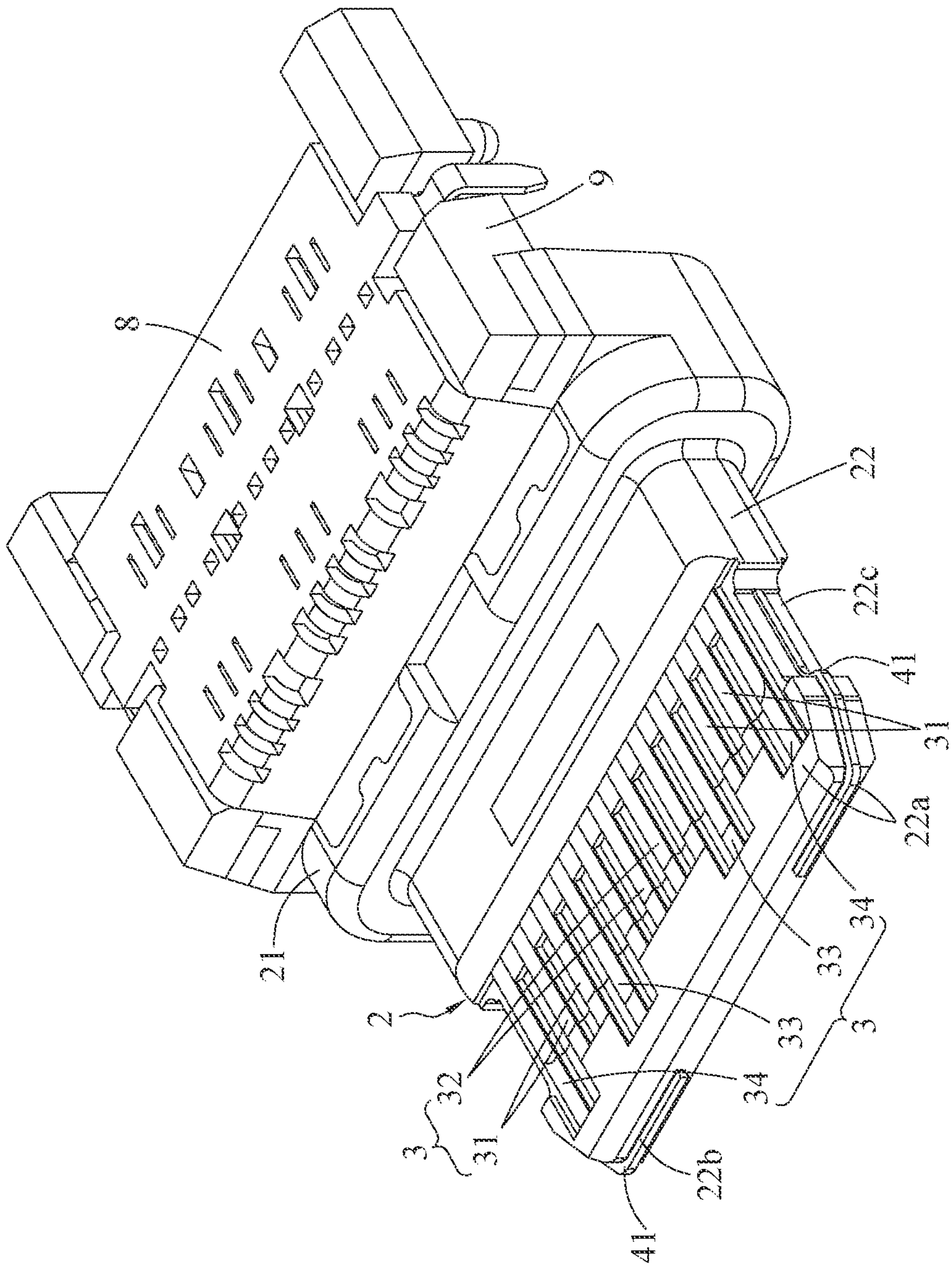
FIG. 4 illustrates a perspective view of the terminal module of the electrical receptacle connector according to some embodiments of the instant disclosure.

Please refer to FIG. 4 and FIG. 5. FIG. 4 illustrates a perspective view of the terminal module of the electrical receptacle connector 100 according to some embodiments of the instant disclosure. FIG. 5 illustrates a top view of the terminal module of the electrical receptacle connector 100 according to some embodiments of the instant disclosure. In some embodiments, the tongue portion 22 has a front side surface 22*b* and two side surfaces 22*c*. The front side surface 22*b* is connected to front side portions of the two faces 22*a*, and the two side surfaces 22*c* are connected to two sides of the two faces 22*a*. In this embodiment, front ends of the protrusions 41 protrude from the front side surface 22*b*, but embodiments are not limited thereto. In some embodiments, the front ends of the protrusions 41 may be in the tongue portion 22 and do not protrude from the front side surface 22*b*.

Please refer to FIG. 4. In some embodiments, the front ends of the protrusions 41 at the two sides of the metallic plate 4 extend toward the front side surface 22*b* of the tongue portion 22, and the front end and two sides of each of the protrusions 41 are exposed from a front end and the two sides of the tongue portion 22. Hence, the structural strength of the tongue portion 22 can be enhanced. Therefore, when an electrical plug connector is slantly inserted into the electrical receptacle connector 100, the tongue portion 22 can be supported by the protrusion 41, and the electrical plug connector in the slanting orientation can be prevented from damaging or breaking the tongue portion 22 upon the electrical plug connector hits the tongue portion 22.

Please refer to FIG. 6. FIG. 6 illustrates a partial top view of the metallic plate 4 of the electrical receptacle connector 100. In some embodiments, each of the communication hole portions communication hole portions 44 has a longitudinal section 441 and a transversal section 442 connected to the longitudinal section 441. As shown in FIG. 6, from a top view of the metallic plate 4, the longitudinal section 441 and the transversal section 442 at the left portion of the metallic plate 4 are together formed as a 90-degree-rotated L-shaped structure. Each of the transversal sections 442 is connected to the first through hole portion 42, and each of the longitudinal sections 441 is connected to a corresponding one of the second through hole portions 43.

Please refer to FIG. 2 and FIG. 7. FIG. 7 illustrates a partial top view of the terminals and the metallic plate 4 of the electrical receptacle connector 100. In some embodiments, the first through hole portion 42, the second through hole portions 43, and the communication hole portions 44 of the metallic plate 4 are holes formed by stamping techniques. In some embodiments, with considerations for avoiding high-frequency interferences, a portion of the contact portion 35 of each of the high-speed signal terminals 31 adjacent to a corresponding one of the power terminals 33 is exposed from a corresponding one of the communication hole portions 44, and the metallic plate 4 is shielded between portions of the contact portions 35 of the high-speed signal terminals 31 at one of the two rows of the terminals 3 and portions of the contact portions 35 of the high-speed signal terminals 31 in the other one of the two rows of the terminals 3 (as shown in FIG. 7, a right portion of the contact portion 35 of the right high-speed signal terminal 31 of the high-speed signal terminals 31 at the left portion is exposed from the communication hole 44, and a left portion of the contact portion 35 of the left high-speed signal terminal 31 of the high-speed signal terminals 31 at the right portion is exposed from the communication hole 44). Hence, crosstalk interferences caused by high-frequency signal transmission can be prevented.

Figure 8:
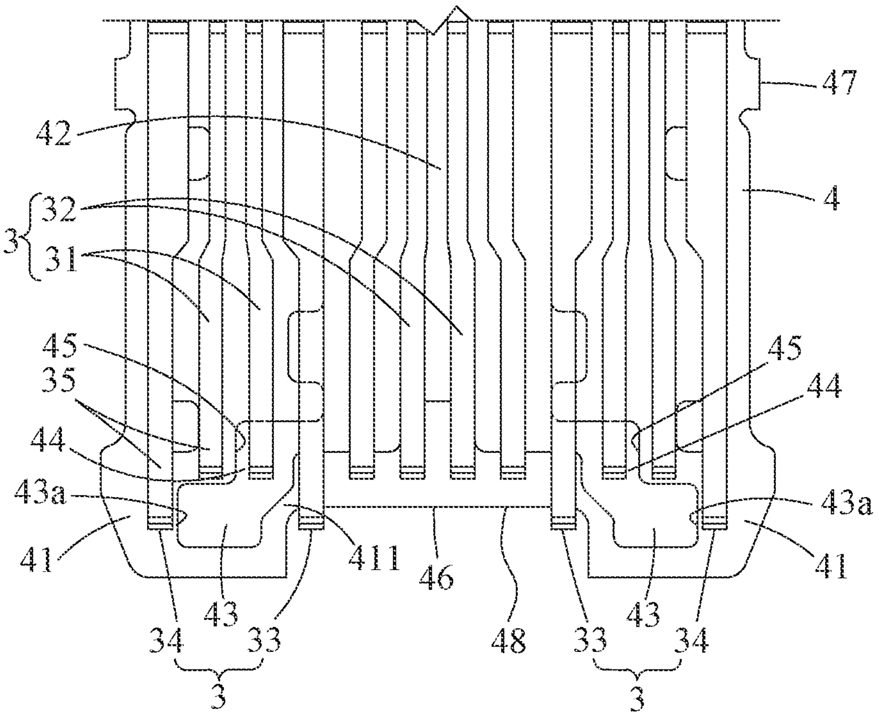
FIG. 8 illustrates a partial top view of the terminals and the metallic plate of the electrical receptacle connector from the viewing angle of FIG. 5, where each of the two sides of the metallic plate has a recessed portion.

Please refer to FIG. 8. FIG. 8 illustrates a partial top view of the terminals 3 and the metallic plate 4 of the electrical receptacle connector 100, where each of two sides of the metallic plate 4 has a recessed portion 45. In some embodiments, the metallic plate 4 has a plurality of recessed portions 45. Each of the recessed portions 45 is at a side portion of a corresponding one of the communication hole portions 44. In this embodiment, the metallic plate 4 has the communication hole portions 44 and the recessed portions 45, so that the width of the hole of the metallic plate 4 can be increased. In some embodiments, with considerations for avoiding high-frequency interferences, the entire contact portion 35 of each of the high-speed signal terminals 31 adjacent to a corresponding one of the power terminals 33 is exposed from a corresponding one of the recessed portions 3 (as shown in FIG. 8, the contact portion 35 of the right high-speed signal terminal 31 of the high-speed signal terminals 31 at the left portion is exposed from the recessed portion 45, and a left portion of the contact portion 35 of the left high-speed signal terminal 31 of the high-speed signal terminals 31 at the right portion is exposed from the recessed portion 45). Therefore, in this embodiment, the electrical receptacle connector 100 can meet the specification for low-frequency signal transmission, and crosstalk interferences caused by high-frequency signal transmission can be prevented.

In some embodiments, in the two rows of the terminals 3, the contact portions 35 of the ground terminals 34 are shielded by the metallic plate 4 (as shown in FIG. 7, the entire contact portion 35 of the ground terminal 34 at the left portion and the entire contact portion 35 of the ground terminal 34 at the right portion correspond to the protrusions 41 and are not exposed from the second through hole portions 43). In this embodiment, owing to the shielding of the metallic plate 4, the contact portions 35 of the ground terminals 34 of the two rows of the terminals 3 do not face each other. In this embodiment, a portion of each of the protrusions 41 at an outer side edge **43*a* of a corresponding one of the second through hole portions 43 is shielded between the contact portion 45 of a corresponding one of the ground terminals 34 at one of the two rows of the terminals 3 and the contact portion 35 of a corresponding one of the ground terminals 34 at the other one of the two rows of the terminals 3**.

In some embodiments, front ends of the contact portions 35 of the high-speed signal terminals 31 at the two rows are shielded by the metallic plate 4 (as shown in FIG. 7, at the upper row of the terminals 3, the front ends of the contact portions 35 of two high-speed signal terminals 31 at the right portion and the front ends of the contact portions 35 of two high-speed signal terminals 31 at the left portion are correspondingly at the inner side edge **43*b* and are not exposed from the second through hole 43). Therefore, in this embodiment, owing to the shielding of the metallic plate 4, the contact portions 35 of the high-speed signal terminals 31 of the two rows of the terminals 3 do not face each other. In this embodiment, the contact portions 35 of the high-speed signal terminals 31 of the two rows of the terminals 3 are shielded by the protrusions 41**.

Please refer to FIG. 6. In some embodiments, each of the protrusions 41 has a turning portion 411 at an inner side edge **43*b* of a corresponding one of the second through hole portions 43. As shown in FIG. 7, the front end of the contact portion 35 of each of the power terminals 33 is at a side portion of a corresponding one of the turning portions 411**.

Please refer to FIG. 7. In some embodiments, an indentation portion 46 is between the protrusions 41, and the front ends of the contact portions 35 of the power terminals 33 are at the indentation portion 46. The indentation portion 46 is between the protrusions 41 and between the power terminals 33. The indentation portion 46 is recessed toward the base portion 21 (as shown in FIG. 5). The end portion of each of the power terminals 321 at one of the two faces **22*a* of the tongue portion 22 faces the end portion of a corresponding one of the power terminals 321 at the other face 22*a* of the tongue portion 22 through the indentation portion 45 (as shown in FIG. 7). Therefore, in this embodiment, when the metallic plate 4 and the insulated housing 2 are inserted molded in the mold, plastic materials are filled into the mold, and the plastic materials can be filled through the hollow region of the indentation portion 46 to form the entire tongue portion 22, thereby increasing the molding efficiency as well as reducing the condition that front ends of the contact portions 35 are not properly covered by the tongue portion 22** (the short shot condition of the plastic materials).

In some embodiments, in the case that the tongue portion 22 does not cover the front ends of the contact portions 35, the plastic materials cannot be properly filled through the hollow region of the indentation portion 46 to form the tongue portion 22 (a possible scenario is that the region of the indentation portion 46 is not large enough). As a result, the efficiency for filling the plastic materials for forming the tongue portion 22 is reduced, and the front ends of the contact portions 35 of the terminals 3 are not covered by the tongue portion 22 and are exposed. Consequently, upon terminals of an electrical plug connector is mated with the contact portions 35 of the electrical receptacle connector 100, the contact portions 35 are prone to be deflected upwardly to cause an improper mating between the terminals of the electrical plug connector and the terminals 3 of the electrical receptacle connector 100. Moreover, since the contact portions 35 are prone to be deflected upwardly, the contact portions 35 may be in contact with each other to cause short circuit condition.

Please refer to FIG. 5. In some embodiments, taking the front side surface **22*b* of the tongue portion 22 as a reference surface, the front end of the contact portion 35 of each of the power terminals 33 and the ground terminals 34 in the two rows is nearer to the front side surface 22*b*, and the front end of the contact portion 35 of each of the high-speed signal terminals 31 and the low-speed signal terminals 32 in the two rows is farer from the front side surface 22*b* (as shown in FIG. 5). The front end of the contact portion 35 of each of the terminals 3 is covered by the tongue portion 22 (as shown in FIG. 3), and an upper surface or a lower surface of each of the contact portions 35 is exposed from the two faces 22*a* of the tongue portion 22**.

Please refer to FIG. 2 and FIG. 3. In some embodiments, the terminals 3 at the upper row and a first insulated member 8 are formed with each other by insert-molding to form a first part, and the terminals 3 at the lower row and a second insulated member 9 are formed with each other by insert-molding, and then the metallic plate 4 is assembled on the second insulated member 9 to form a second part. Then, the first part and the second part are combined with each other, and the insulated housing 2 is combined with an assembly of the first part and the second part.

Please refer to FIG. 2 and FIG. 4. FIG. 4 illustrates a perspective view of the terminal module of the electrical receptacle connector according to some embodiments of the instant disclosure. In some embodiments, the high-speed signal terminals 31 are divided into two groups respectively at two outermost sides of the low-speed signal terminals 32. The ground terminals 34 are at two outermost sides of the power terminals 33. The low-speed signal terminals 32 are between the power terminals 33. In at least one of the two rows at the two faces 22*a* of the tongue portion 22, each of the two groups of the high-speed signal terminals 31 is between an adjacent one of the power terminals 33 and an adjacent one of the ground terminals 34.

Please refer to FIG. 2 to FIG. 4. In some embodiments, the terminals 3 at one of the two faces 22*a* of the tongue portion 22 has four high-speed signal terminals 31 and two low-speed signal terminals 32, and the terminals 3 at the other face 22*a* of the tongue portion 22 has four high-speed signal terminals 31 and two low-speed signal terminals 32. Moreover, in some embodiments, the terminals 3 at one of the two faces 22*a* of the tongue portion 22 has two power terminals 33 and two ground terminals 34, and the terminals 3 at the other face 22*a* of the tongue portion 22 has two power terminals 33 and two ground terminals 34. In some embodiments, the area of the metallic plate 4 is extended in length and width to correspond to the entire tongue portion 22. Therefore, the metallic plate 4 can increase the structural strength of the tongue portion 22. The two sides of the metallic plate 4 protrude from two sides of the tongue portion 22 so as to be buckled by hooks of an electrical plug connector. Therefore, when an electrical plug connector is inserted into the electrical receptacle connector 100, owing to the two protruding sides of the metallic plate 4, the buckling pieces at the two sides of the electrical plug connector can be prevented from wearing against the two sides of the tongue portion 22 to cause the wearing and damaging of the tongue portion 22.

Please refer to FIG. 5. In some embodiments, each of the two sides of the metallic plate 4 has a connection portion 47, and the connection portions 47 are at the base portion 21. In this embodiment, the metallic plate 4 is connected to a material belt through the connection portions 47, and the connection portions 47 are not at the tongue portion 22.

Please refer to FIG. 2 and FIG. 3. In some embodiments, the metallic shell 1 is a multi-piece structure. The metallic shell 1 comprises an inner shell and a cover plate. The inner shell is a tubular structure and is fitted over the insulated housing 2. The cover plate is fitted over the inner shell, but embodiments are not limited thereto. In some embodiments, the metallic shell 1 may be a unitary element.

Please refer to FIG. 2 and FIG. 3. In some embodiments, the terminals 3 comprise body portions 36 and tail portions 37. The body portions 36 are held at the first insulated member 8 or the second insulated member 9. Each of the contact portions 35 extends from one of two ends of a corresponding one of the body portions 36 and at one or the other of the two faces 22*a* of the tongue portion 22. Each of the tail portions 37 extends from the other end of a corresponding one of the body portions 36 and protrudes from a rear portion of the first insulated member 8 or a rear portion of the second insulated member 9. The tail portions 37 are aligned horizontally to form flat legs (SMT (surface mount technology) legs which can be soldered or mounted on the surface of a circuit board using surface mount technology) and vertical legs (through-hole legs which can be soldered on the surface of a circuit board by through hole technology).

Please refer to FIG. 2 and FIG. 3. In some embodiments, the pin arrangement of the terminals 3 at the upper row of the tongue portion 22 shown in FIG. 2 is, from left to right, a ground terminal 34 (Gnd), a first pair of high-speed signal terminals 31 (TX1+−, differential signal terminals for high-speed signal transmission), a power terminals 33 (Power/VBUS), a function detection terminal (CC1, a terminal for inserting orientation detection of the connector and for cable recognition), a pair of low-speed signal terminals 32 (D+−, differential signal terminals for low-speed signal transmission), a reserved terminal (SBU1, which may be defined to provide other purposes), another power terminal 33 (Power/VBUS), a second pair of high-speed signal terminals 31 (RX2+−, differential signal terminals for high-speed signal transmission), and another ground terminal 34 (Gnd). In this embodiment, twelve terminals 3 are provided at the upper row of the tongue portion 22 for transmitting USB 3.0 signals.

Please refer to FIG. 2 and FIG. 3. In some embodiments, the pin arrangement of the terminals 3 at the lower row of the tongue portion 22 shown in FIG. 2 is, from right to left, a ground terminal 34 (Gnd), a first pair of high-speed signal terminals 31 (TX2+−, differential signal terminals for high-speed signal transmission), a power terminals 33 (Power/VBUS), a function detection terminal (CC2, a terminal for inserting orientation detection of the connector and for cable recognition), a pair of low-speed signal terminals 32 (D+−, differential signal terminals for low-speed signal transmission), a reserved terminal (SBU2, which may be defined to provide other purposes), another power terminal 33 (Power/VBUS), a second pair of high-speed signal terminals 31 (RX1+−, differential signal terminals for high-speed signal transmission), and another ground terminal 34 (Gnd). In this embodiment, twelve terminals 3 are provided at the lower row of the tongue portion 22 for transmitting USB 3.0 signals.

In some embodiments, the metallic plate 4 has several pins extending from two sides of the rear portion of the metallic plate 4 to form vertical legs (through-hole legs). In some embodiments, when signals are transmitted between the terminals of the electrical plug connector and the terminals 3 of the electrical receptacle connector 100, the terminals 3 of the electrical receptacle connector 100 can be isolated from each other by the metallic plate 4 to reduce the crosstalk signal interferences upon signal transmission. Moreover, the pins are provided for connecting to a circuit board for conduction and grounding. The metallic plate 4 is at the tongue portion 22 to increase the structural strength of the tongue portion 22.

Based on the above, according to one or some embodiments of the instant disclosure, in the metallic plate, the communication hole portions are in communication with the first through hole portion and the second through hole portions. Therefore, when the metallic plate and the insulated housing are molded by insert-molding, plastic materials can be conveniently filled through the hollow regions of the communication hole portions to form the entire tongue portion, thereby increasing the molding efficiency as well as reducing the condition that front ends of the contact portions of the terminals are not properly covered by the tongue portion (the short shot condition of the plastic materials).

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An electrical receptacle connector, comprising:

a metallic shell comprising a receiving cavity;

an insulated housing in the receiving cavity, wherein the insulated housing comprises a base portion and a tongue portion extending outwardly from one side of the base portion;

a plurality of terminals arranged in two rows and at the insulated housing; and a metallic plate at the tongue portion and between the terminals in the two rows, wherein the metallic plate has a large cutout at a front edge thereof, each of two sides of the metallic plate has a protrusion, and a side portion of each of the protrusions is exposed from a corresponding one of two sides of the tongue portion; the metallic plate has a first through hole portion, a plurality of second through hole portions, and a plurality of communication hole portions; the first through hole portion is located at a central portion of the metallic plate; each of the second through hole portions is between a corresponding one of the protrusions and the large cutout; each of the communication hole portions is between the first through hole portion and a corresponding one of the second through hole portions and is in communication with the first through hole portion and a corresponding one of the second through hole portions.

2. The electrical receptacle connector according to claim 1, wherein the terminals comprise a plurality of contact portions, and the contact portions are at two faces of the tongue portion; the terminals comprise a plurality of high-speed signal terminals, a plurality of low-speed signal terminals, a plurality of power terminals, and a plurality of ground terminals; the ground terminals are at two outermost sides of the power terminals, and the low-speed signal terminals are between the power terminals; each of the high-speed signal terminals is between an adjacent one of the power terminals and an adjacent one of the ground terminals.

3. The electrical receptacle connector according to claim 1, wherein a portion of the contact portion of each of the high-speed signal terminals adjacent to a corresponding one of the power terminals is exposed from a corresponding one of the communication hole portions.

4. The electrical receptacle connector according to claim 1, wherein the metallic plate has a plurality of recessed portions, each of the recessed portions is at a side portion of of a corresponding one of the communication hole portions, and the contact portion of each of the high-speed signal terminals adjacent to a corresponding one of the power terminals is exposed from a corresponding one of the recessed portions.

5. The electrical receptacle connector according to claim 1, wherein a portion of each of the protrusions at an outer side edge of a corresponding one of the second through hole portions is shielded between the contact portion of a corresponding one of the ground terminals at one of the two rows of the terminals and the contact portion of a corresponding one of the ground terminals at the other one of the two rows of the terminals.

6. The electrical receptacle connector according to claim 1, wherein a portion of each of the protrusions at a rear edge of a corresponding one of the second through hole portions is shielded between the contact portion of a corresponding one of the high-speed signal terminals at one of the two rows of the terminals and the contact portion of a corresponding one of the high-speed signal terminals at the other one of the two rows of the terminals.

7. The electrical receptacle connector according to claim 1, wherein the tongue portion has a front side surface and two side surfaces, the front side surface is connected to front side portions of the two faces, and the two side surfaces are connected to two sides of the two faces; outer portions of the protrusions protrude from the two side surfaces, and front ends of the protrusions protrude from the front side surface.

8. The electrical receptacle connector according to claim 1, wherein each of the communication hole portions has a longitudinal section and a transversal section connected to the longitudinal section; each of the transversal sections is connected to the first through hole portion, and each of the longitudinal sections is connected to a corresponding one of the second through hole portions.

9. The electrical receptacle connector according to claim 2, wherein the first through hole portion corresponds to the low-speed signal terminals.

10. The electrical receptacle connector according to claim 2, each of the second through hole portions corresponds to a portion between the contact portion of a corresponding one of the power terminals and the contact portion of a corresponding one of the ground terminals.

11. The electrical receptacle connector according to claim 2, each of the communication hole portions is between an adjacent one of the power terminals and an adjacent one of the high-speed signal terminals.

12. The electrical receptacle connector according to claim 3, wherein each of the protrusions has a turning portion at an inner side edge of a corresponding one of the second through hole portions; an indentation portion is between the protrusions, and front ends of the contact portions of the power terminals are at the indentation portion.

13. An electrical receptacle connector, comprising:

a metallic shell comprising a receiving cavity;

an insulated housing in the receiving cavity, wherein the insulated housing comprises a base portion and a tongue portion extending outwardly from one side of the base portion;

a plurality of terminals arranged in two rows and at the insulated housing, wherein the terminals comprise a plurality of contact portions, and the contact portions are at two faces of the tongue portion; the terminals comprise a plurality of high-speed signal terminals, a plurality of low-speed signal terminals, a plurality of power terminals, and a plurality of ground terminals;

the ground terminals are at two outermost sides of the power terminals, and the low-speed signal terminals are between the power terminals; in at least one of the two rows of the terminals, each of the high-speed signal terminals is between an adjacent one of the power terminals and an adjacent one of the ground terminals; and a metallic plate at the tongue portion and between the terminals in the two rows, wherein each of two sides of the metallic plate has a protrusion, and a side portion of each of the protrusions is exposed from a corresponding one of two sides of the tongue portion; the metallic plate has a hole portion, a plurality of second through hole portions, and a plurality of communication hole portions; the first through hole portion corresponds to the low-speed signal terminals; each of the second through hole portions is at a corresponding one of the protrusions and corresponds to a portion between the contact portion of a corresponding one of the power terminals and the contact portion of a corresponding one of the ground terminals; each of the communication hole portions is between an adjacent one of the power terminals and an adjacent one of the high-speed signal terminals and is in communication with the first through hole portion and a corresponding one of the second through hole portions.

14. The electrical receptacle connector according to claim 13, wherein a portion of the contact portion of each of the high-speed signal terminals adjacent to a corresponding one of the power terminals is exposed from a corresponding one of the communication hole portions.

15. The electrical receptacle connector according to claim 13, wherein the metallic plate has a plurality of recessed portions, each of the recessed portions is at a side portion of a corresponding one of the communication hole portions, and the contact portion of each of the high-speed signal terminals adjacent to a corresponding one of the power terminals is exposed from a corresponding one of the recessed portions.

16. The electrical receptacle connector according to claim 13, wherein a portion of each of the protrusions at an outer side edge of a corresponding one of the second through hole portions is shielded between the contact portion of a corresponding one of the ground terminals at one of the two rows of the terminals and the contact portion of a corresponding one of the ground terminals at the other one of the two rows of the terminals.

17. The electrical receptacle connector according to claim 13, wherein a portion of each of the protrusions at a rear edge of a corresponding one of the second through hole portions is shielded between the contact portion of a corresponding one of the high-speed signal terminals at one of the two rows of the terminals and the contact portion of a corresponding one of the high-speed signal terminals at the other one of the two rows of the terminals.

18. The electrical receptacle connector according to claim 13, wherein the tongue portion has a front side surface and two side surfaces, the front side surface is connected to front side portions of the two faces, and the two side surfaces are connected to two sides of the two faces; outer portions of the protrusions protrude from the two side surfaces, and front ends of the protrusions protrude from the front side surface.

19. The electrical receptacle connector according to claim 13, wherein each of the communication hole portions has a longitudinal section and a transversal section connected to the longitudinal section; each of the transversal sections is connected to the first through hole portion, and each of the longitudinal sections is connected to a corresponding one of the second through hole portions.

20. The electrical receptacle connector according to claim 14, wherein each of the protrusions has a turning portion at an inner side edge of a corresponding one of the second through hole portions; an indentation portion is between the protrusions, and front ends of the contact portions of the power terminals are at the indentation portion.

* * * * *